United States Patent [19]

Tanaka

[11] Patent Number: 5,056,846
[45] Date of Patent: Oct. 15, 1991

[54] PARTITION PLATE FOR AUTOMOTIVE VEHICLE

[75] Inventor: Yasuo Tanaka, Kanagawa, Japan

[73] Assignee: Ikeda Bussan Co., Ltd., Ayase, Japan

[21] Appl. No.: 666,142

[22] Filed: Mar. 7, 1991

[30] Foreign Application Priority Data

Mar. 31, 1990 [JP] Japan .............................. 2-34855[U]

[51] Int. Cl.5 ............................................. B62D 43/10
[52] U.S. Cl. .................................. 296/37.1; 296/37.3; 292/83; 292/91
[58] Field of Search ................ 296/37.1, 37.3; 292/83, 292/91

[56] References Cited

U.S. PATENT DOCUMENTS

| 2,507,511 | 5/1950 | Freidag et al. | 292/91 X |
| 3,039,802 | 6/1962 | Barry | 292/83 X |
| 4,500,120 | 2/1985 | Ridgewell et al. | 292/83 X |
| 4,991,898 | 2/1991 | Nomura | 296/37.3 X |

Primary Examiner—Margaret A. Focarino
Assistant Examiner—Gary C. Hoge
Attorney, Agent, or Firm—Foley & Lardner

[57] ABSTRACT

A partition plate, which is used for dividing a luggage compartment of a vehicle, comprises a locking device with which the partition plate is lockably fittable to a luggage floor when either surface of the partition plate is put on the luggage floor. The locking device includes a C-shaped lock spring which nips a projecting pin of the luggage floor to lock the partition plate to the luggage floor. The spring is enlarged in diameter by the pushing of a aliding member of the locking device.

7 Claims, 6 Drawing Sheets

PARTITION PLATE FOR AUTOMOTIVE VEHICLE

BACKGROUND OF THE INVENTION

1. Field of the Invention

The present invention relates to improvements in a partition plate which is used to divide a luggage compartment of an automotive vehicle into a main compartment and a sub-compartment for storing a spare tire and/or the like, and more particularly to a partition plate in which a locking device is provided to secure the partition plate to the luggage compartment even if either surface of the partition plate is faced to the sub-compartment.

2. Description of the Prior Art

It is well known that a partition plate for dividing a luggage compartment is used for an automotive vehicle. Since such a partition plate has a relatively large flat surface and is detachable so that is can be removed from the luggage compartment, it has been proposed that the partition plate be used as a table in the outdoors upon its removal from the luggage compartment. The partition plate is the type which is reversibly usable.

An example of such a conventional partition plate 6 is shown in FIG. 14 of the present application, in which the partition plate 6 is detachably installed on a luggage floor 5 of a luggage compartment (no numeral). The partition plate 6 includes a locking device 10 with which the partition plate 6 is fixedly secured to a connecting member 9 formed at an end section 5a of the luggage floor 5. As shown in FIG. 14, the locking device 10 includes a housing member 11 installed to a recess of the partition plate 6, a control lever 12 formed at a depression of the housing 11, a locking member 13 connected to the control lever 12 and a spring 14 by which the locking member 13 is pushed to be under a locking condition. When the control lever 12 is rotated in the direction of an arrow F as indicated in FIG. 14, the locking member 13 is downwardly inclined and released from the connecting member 9 so that the partition plate 6 is unlocked from the luggage floor 5.

However, with this conventional arrangement, the locking device 10 is formed so that only one side of the partition plate 6 can be fixedly fitted to the luggage floor 5. Furthermore, when the partition plate 6 is installed on the luggage compartment, a clearance is formed between the locking device 10 and the luggage floor end section 5a, thereby degrading an external appearance of the luggage compartment.

SUMMARY OF THE INVENTION

It is an object of the present invention to provide an improved partition plate which is lockably installed to a luggage floor when either surface of the partition plate is faced to a covered space.

A partition plate of the present invention in use for a vehicle is detachable from a member defining a compartment which member is provided with a projecting pin. The partition plate comprises a board section and a locking device installed to the board section. The locking device includes a housing member having a through-hole through which the projecting pin passes from one surface to the other surface of the housing member when the partition plate is secured to the compartment defining member. A generally C-shaped lock spring has a middle portion and a pair of opposite end portions. The lock spring is lockably engageable with the projecting pin. The middle portion is fixed to the sliding member. The opposite end portions define a clearance therebetween. A sliding member has a generally wedge shaped portion which is disposed in the lock spring clearance and contactable with the lock spring end portions so that the lock spring is deformable upon movement of the sliding member. A pair of control levers are connected to the sliding member to move the sliding member against a bias of the lock spring. The pair of control levers is located opposite to each other with respect to a center plane of the board section.

With this arrangement, the partition plate is fittable to the luggage with either surface of the partition plate. Furthermore, the partition plate can be disposed without an excessive clearance between the locking device and the luggage floor. Therefore, the partition plate is largely improved in use and quality.

BRIEF DESCRIPTION OF THE DRAWING

In the drawings, the same numerals designate the same elements and parts throughout all the figures, in which.

DETAILED DESCRIPTION OF THE INVENTION

Figure 1:
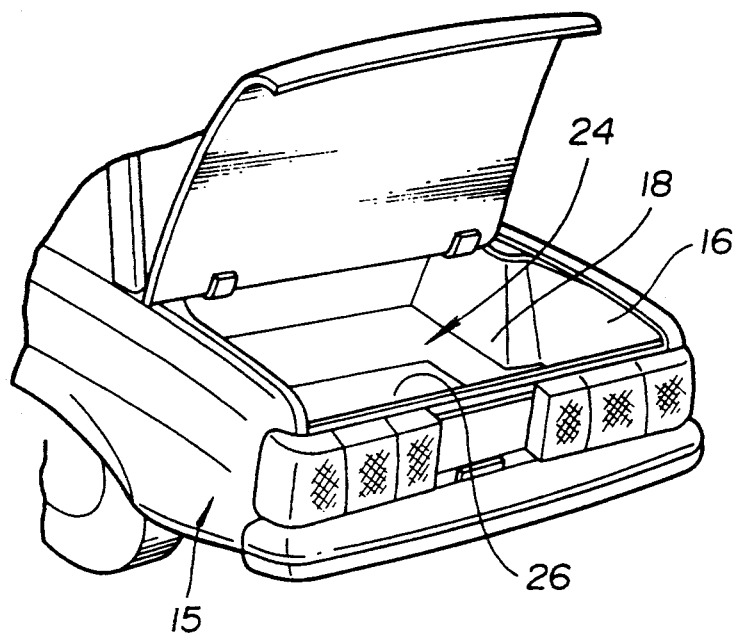
FIG. 1 is a backward perspective view of an automotive vehicle having a partition plate according to the present invention.
Figure 2:
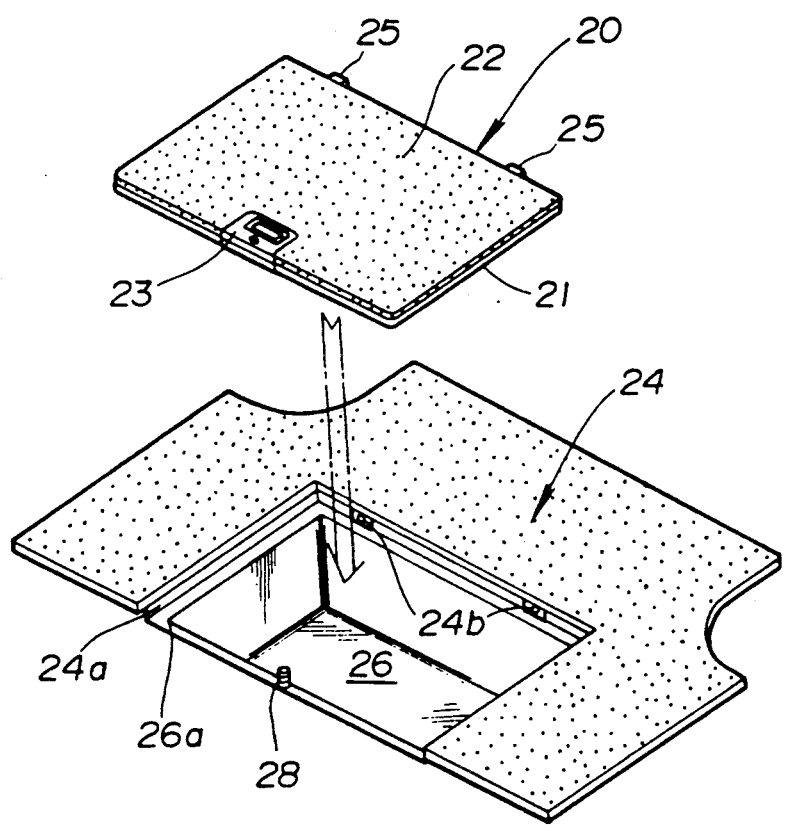
FIG. 2 is a perspective view of an embodiment of a partition plate according to the present invention and a luggage floor.
Figure 3:
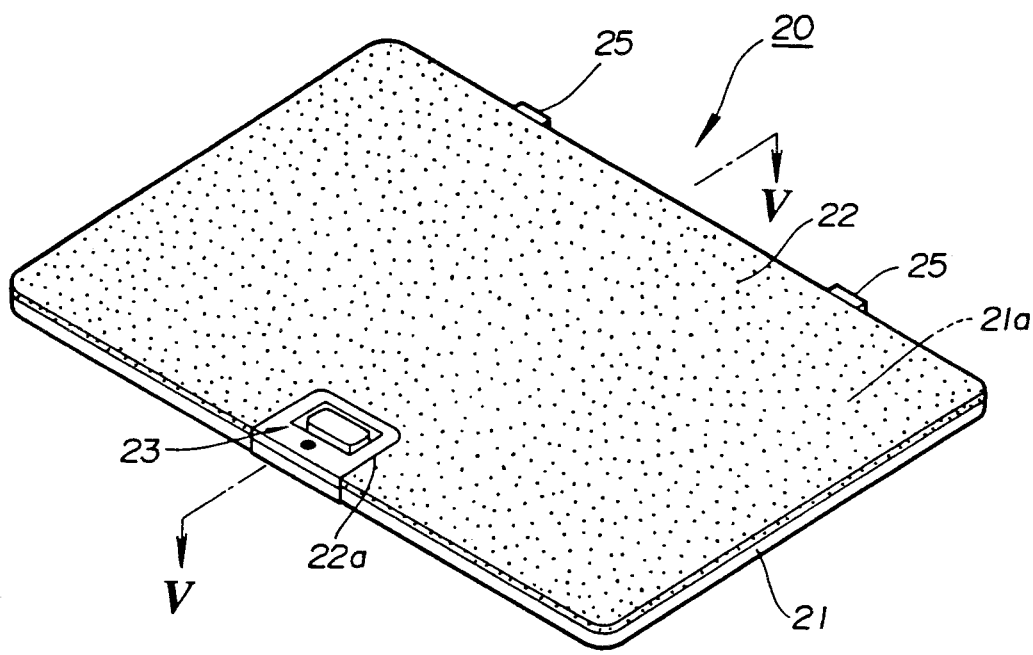
FIG. 3 is a perspective view of the partition plate of FIG. 2.
Figure 4:
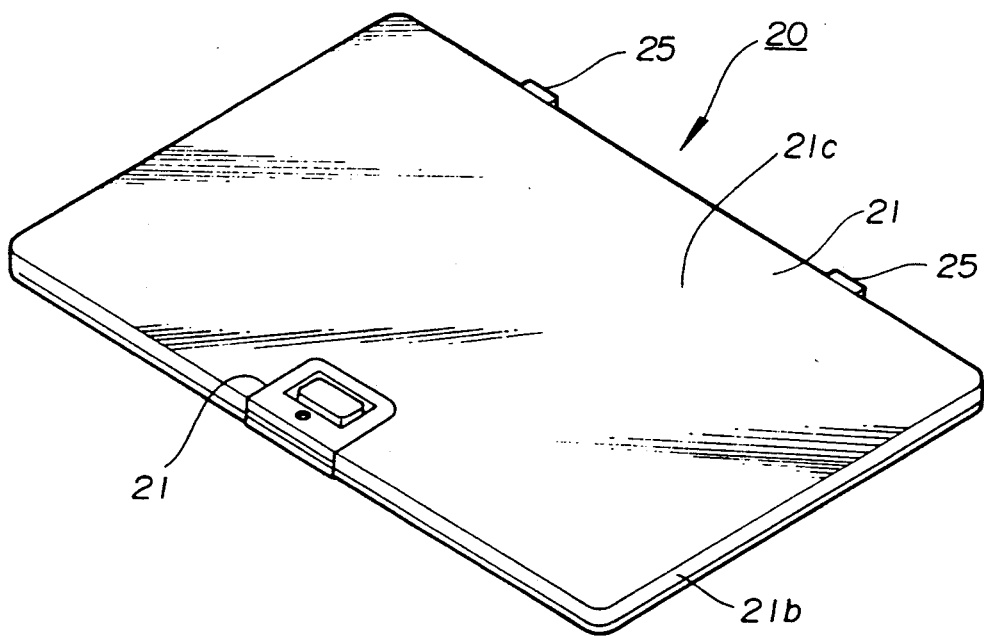
FIG. 4 is another perspective view of the partition plate as viewed from the opposite direction of FIG. 3.

Referring now to FIGS. 1 to 10, an embodiment of the partition plate according to the present invention is illustrated by the reference numeral 20. The partition plate 20 is used for covering a sub-space 26 formed in a luggage compartment 16 of an automotive vehicle 15. The sub-space 26 is located under a main space 18 of the luggage compartment 16 and arranged to store a spare tire and/or the like therein though not shown. The partition plate 20 of a generally rectangular shape comprises a board 21 which has such a size as to be fitted with a section 24a of the luggage floor 24. The board 21 is formed of a molded plastic and has a hollow 21d therein.

The board 21 includes a right surface 21a, a reverse surface 21c and a side peripheral surface 21b. The right and reverse surfaces 21a, 21c are parallel with each other, forming the hollow 21d therebetween. The side peripheral surface 21b is integral with the edges of the right and reverse surfaces 21a, 21c so as to sealingly surround the hollow 21d. The right surface 21a is covered with a carpet 22 serving as a trim member.

The board 21 is formed with a recess 22a at a middle part of its front side end. A locking device 23 is provided in the recess 22a to be generally flush with the surfaces 21a, 21c of the board 21. A pair of connecting members 25 are outwardly projected from the side peripheral surface 21b of an opposite side to the recess 22a of the board 21.

The partition plate 20 is fitted on a step section 26a of the sub-space 26 in a manner that the connecting members 25 are inserted into holes 24b formed at the section 24a, so that the locking device 23 is fixedly connected with a projecting pin 28 formed on the step section 26a. The projecting pin 28 has a slender or neck portion 28a and is disposed at the front middle side end of the section 24a. The projecting pin 28 can be inserted into a through-hole 29a of the locking device 23 when either surface of the partition plate 20 is faced to the sub-space 26.

Figure 5:
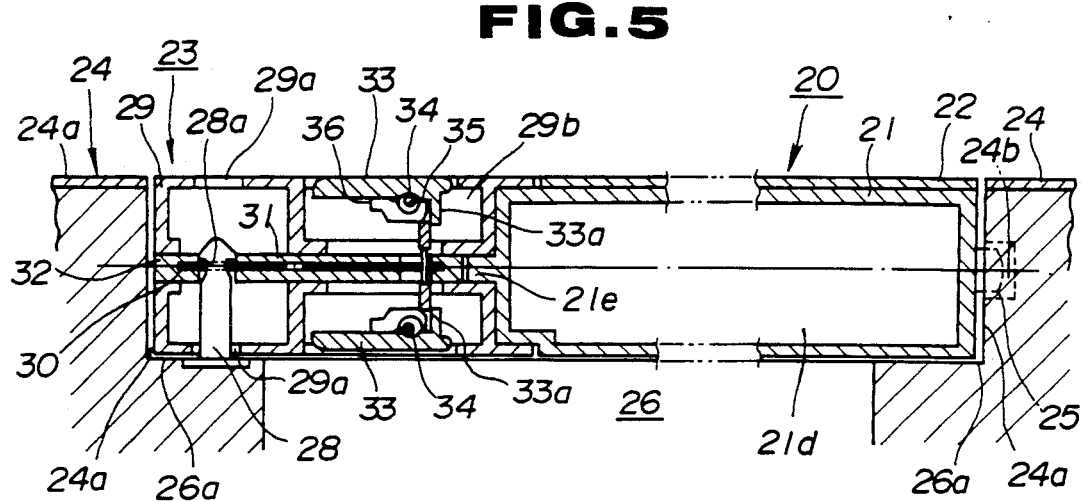
FIG. 5 is a cross-sectional view taken in the direction of arrows substantially along a line V—V of FIG. 3.

The locking device 23 includes a pair of housing members 29. Each housing member 29 is formed of a molded plastic and is disposed at the recess 22a of the board 21. Each of the housing members 29 is secured so as to nip an installation projection 21e of the board 21 and a pair of supporting plates 32. The housing member 29 has the through-holes 29a through which a projecting pin 28 passes to be secured to the locking device 23 when either surface of the partition plate 20 is faced to the sub-space 26. The housing member 29 has rectangular depressions 29b formed at outer sides of the housing member 29. A pair of control levers 33 are disposed respectively in the depressions 29b to be generally flush with the surfaces 21a, 21c of the partition plate 20. The control levers 33 are located opposite to each other with respect to a center plane C of the board as shown in FIG. 5. Each control lever 33 is pivotally supported by a shaft 34 secured to the housing member 29. A spring 35 is installed around the shaft 34 so that the control lever 33 tends to be rotated from its vertical state to its horizontal state. Additionally, a stopper 36 is attached on one inside surface of the control lever 33 so that a position of the control lever 33 is kept at the horizontal state. The control lever 33 has a projection part 33a which is formed in the vicinity of the shaft 34 and extends inward of the board 21 under the horizontal state.

A pair of supporting plates 32 are disposed between the housing members 29 and along the plane C. The supporting plate 32 has a through-hole 32a which is formed coaxial with the through-hole 29a when the supporting plate 32 is installed to the partition plate 20. The through-hole 32a is positioned on a line X equally dividing the partition plate so that an axis of the through-hole 32a crosses the line X. The supporting plate 32 has a rectangular groove 32b in which a lock spring 30 is disposed. The supporting plates 32 are disposed so that the grooves 32b face to each other. A slot 32c is formed along the line X and positioned at a central part of the supporting plate 32.

Figure 6:
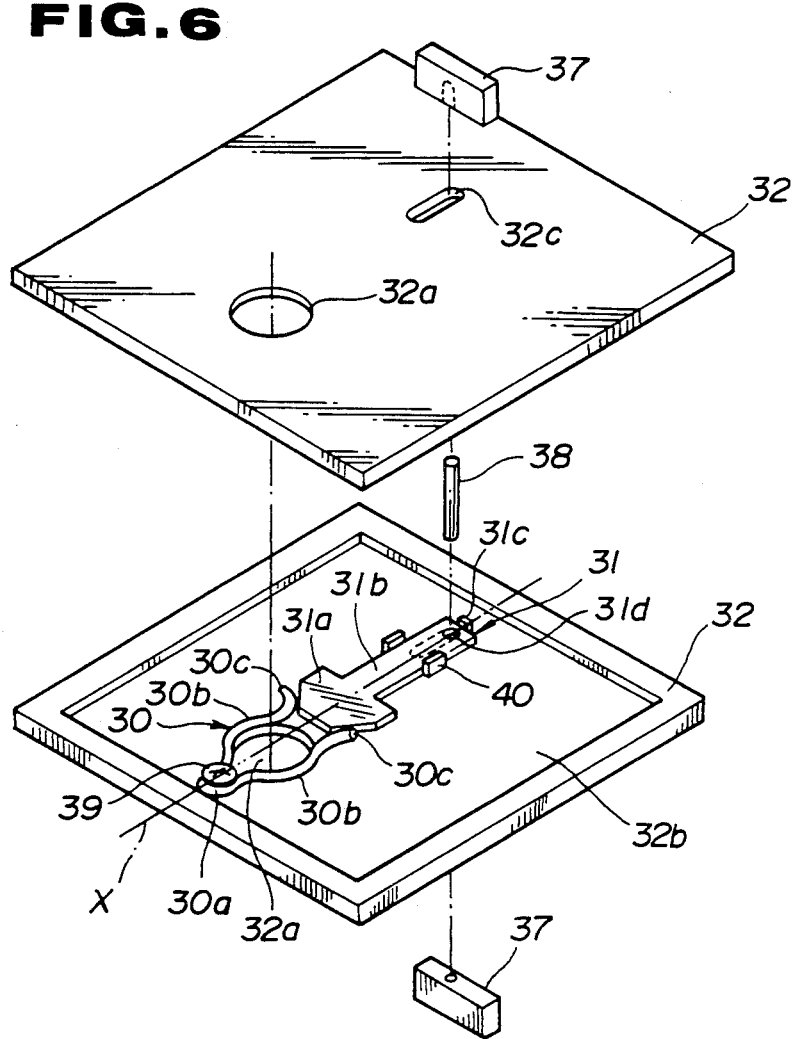
FIG. 6 is an exploded perspective view of an essential part of a locking device of the partition plate.
Figure 7:
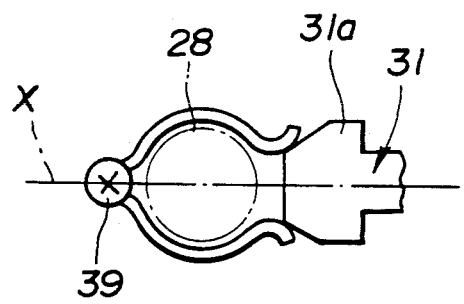
FIG. 7 is a fragmentary plan view of the locking device under the locking condition.
Figure 8:
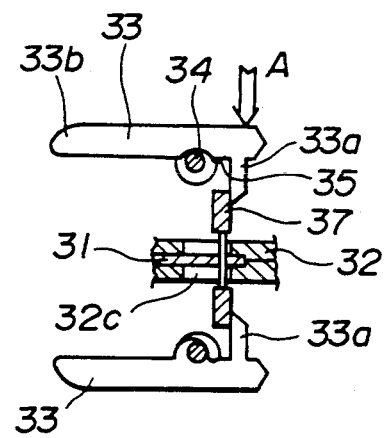
FIG. 8 is a fragmentary side view, partly in section, of the locking device under a locking condition.
Figure 9:
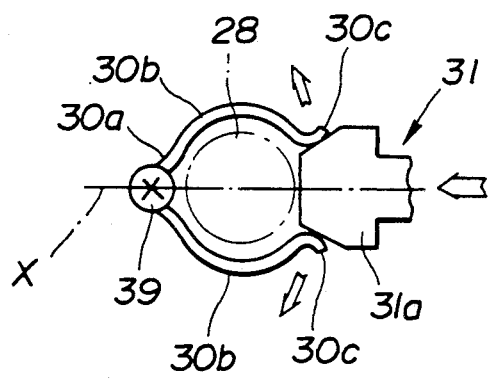
FIG. 9 is a fragmentary plan view of the locking device under the unlocking condition.

The lock spring 30 formed in a C-shape is disposed between the supporting plates 32 as shown in FIG. 6. The lock spring 30 is made of a spring wire and has a pair of nipping portions 30b with which the projecting pin 28 is resiliently engaged at its slender portion 28a. The slender portion 28a is nipped by the nipping portions 30b. Each nipping portion 30b is integral with an end portion 30c as shown in FIG. 6.

A sliding member 31 has a generally wedge shaped tip end portion 31a and a handle portion 31b which are integral with each other and formed in a generally T-shape. The sliding member 31 is supported by a pair of protruding members 40 so as to be slidably movable along the line X. The tip end portion 31a is disposed in the clearance defined by both end portions 30c and contacted with the end portions 30c so that the lock spring 30 is enlarged in diameter when the sliding member 31 pushes against the lock spring 30.

A connecting shaft 38 is disposed to pass through the slot 32c and a through-hole 31d of the sliding member 31. A pair of connecting members 37 are fixedly secured to the both ends of the connecting shaft 38. Accordingly, when the connecting member 37 is pushed by the projecting section 33a of the control lever 33 in accordance with the rotational movement of the control lever 33, the lock spring 30 is deformed so that the end portions 30c are outwardly opened when pushed by the sliding member 31.

The manner of operation of the thus arranged locking device 23 of the partition plate 20 will be discussed hereinafter referring to FIG. 7-10.

In order to attach the partition plate 20 to the step section 26a of the sub-space 26, an attaching operation is carried out as follows: The connecting members 25 are inserted into the connecting holes 27, respectively. The partition plate 20 is put on the step section 26a so that the through-hole 29a of the housing member 29 is located on the projecting pin 28. The nipping portion 30b of the lock spring 30 is resiliently enlarged in its inner diameter by the projecting pin 28 after a top portion of the projecting pin 28 passes through the nipping portion 30b. The top portion 30a of the projecting pin 28 is such formed as to easily pass the nipping portion 30b. Then, the slender portion 28a is secured by the nipping portion 30b in a manner that the nipping portion 30b is decreased in diameter. Thus, the partition plate 20 is secured to the step section 26a so as to be fitted to the step section 26a. Furthermore, the opposite surfaces of the partition plate 20 may be fitted on the step section 26a.

Figure 10:
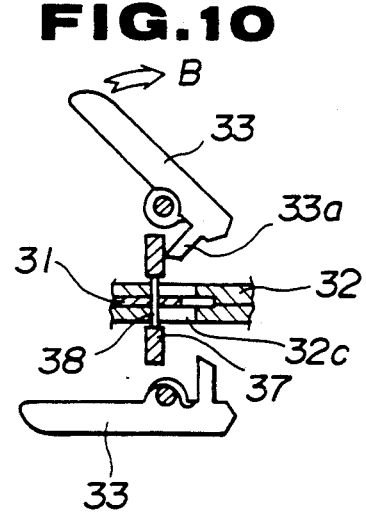
FIG. 10 is a fragmentary side view, partly in section, of the locking device under an unlocking condition.

In order to detach the partition plate 20 from the step section 26a, a detaching operation is carried out as follows: First, the control lever 33 positioned at the upper side is pushed to be lifted at its first end 33b. Then, the control lever 33 is turned clockwise as shown in FIG. 10. When the control lever 33 is turned clockwise as shown in FIG. 10, it forces the sliding member 31 to slid along line X via the projecting portion 33a, the connecting member 37 and the connecting shaft 38. Simultaneously, the connecting member 37 moves along the slot 32c through the connecting shaft 38 in accordance with the movement of the sliding member 31. As a result, the nipping portion 30b is deformed to be enlarged at its inner diameter, thereby releasing the connecting pin 28. With this operation, the connecting pin 28 becomes free from the lock spring 30. Next, the partition plate 20 is lifted so that a clearance is formed between the partition plate 20 and the step section 26a. The partition plate 20 is detached by being pulled out. The control lever 33 receives a biasing force of the spring 35 so as to be returned into a flat state relative to the board 21.

Under the condition of FIG. 10, the lock spring 30 pushes the supporting plate 32 to return to the locking condition since the end portions 30c are contacted to and push the head portion 31a of the sliding member 31. Accordingly, the control lever 33 is returned into the locking condition upon the releasing of the control lever 33. Furthermore, the lock spring 30 is returned into the shape of the locking condition since the sliding member 31 becomes free from the projecting portion 33a and the end portions 30c push the sliding member 31 away.

With the thus arranged locking device 23 of the partition plate 20, the partition plate 20 is secured to the step section 26a even if either surface of the partition plate 20 is fitted on the step section 26a. Furthermore, since the locking device 23 is designed to reduce the number of component parts as small as possible, the partition plate 20 can be produced inexpensively.

Figure 11:
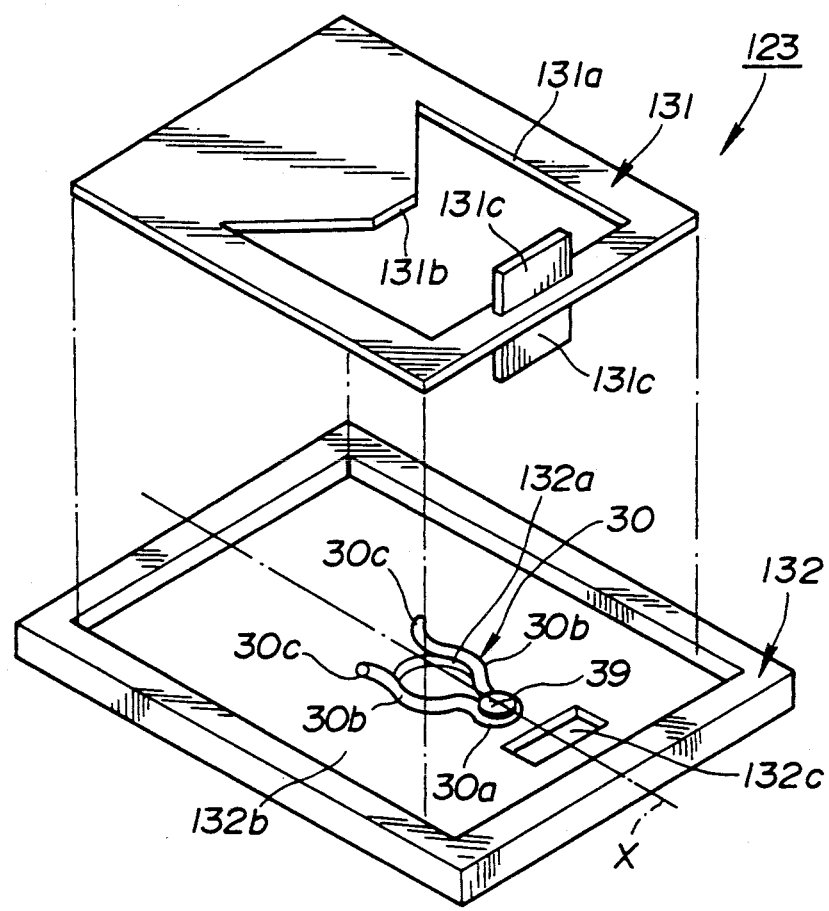
FIG. 11 is an exploded perspective view of an essential part of a locking device of a second embodiment according to the present invention.
Figure 12:
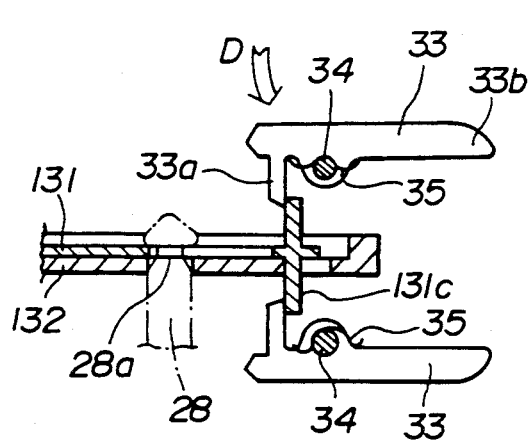
FIG. 12 is a fragmentary side view, partly in section, of the locking device of the second embodiment under a locking condition.
Figure 13:
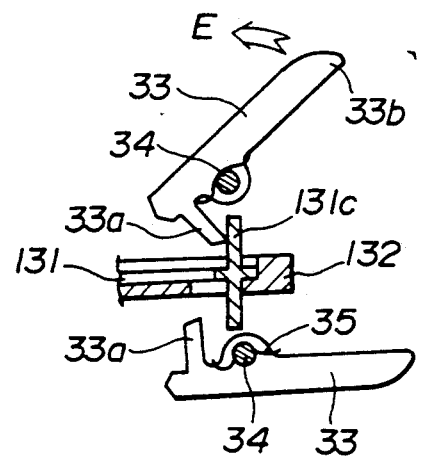
FIG. 13 is a fragmentary side view, partly in section, of the locking device of the present invention under an unlocked condition.
Figure 14:
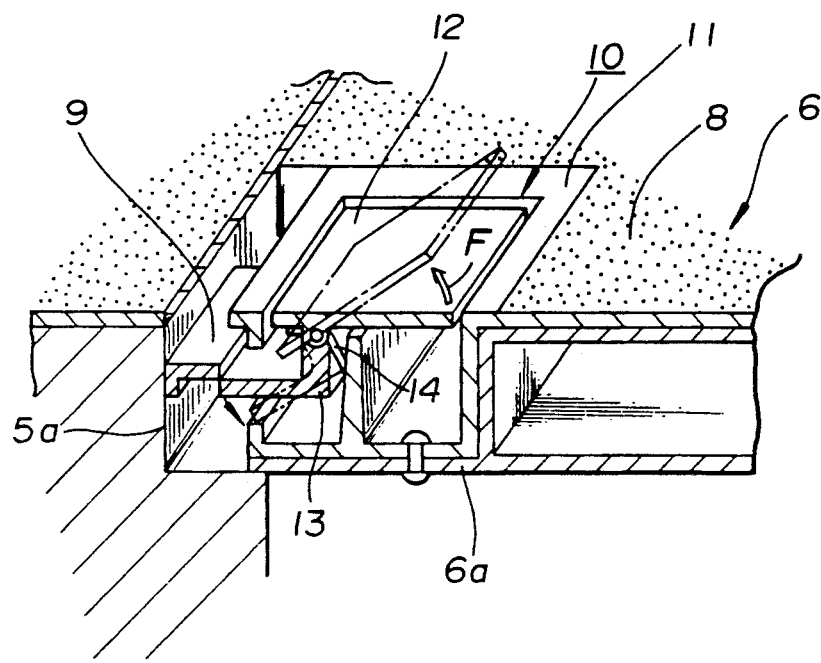
FIG. 14 is a fragmentary perspective view of a conventional partition plate installed to a luggage floor.

FIGS. 11 to 13 illustrate a second embodiment of the partition plate 20 according to the present invention, which is similar to the first embodiment except for a locking device 123. The locking device 123 includes a supporting plate 132 having a hole 132a formed coaxial with the through-hole 29a. The supporting plate 132 has a rectangular groove 132b in which the lock spring 30 is disposed. A rectangle sliding member 131 is disposed in the groove 132b so as to be slidable in the direction of the line X. A connecting portion 131c of the sliding member 131 passes through a slit 132c of the supporting plate 132 so that the sliding member 131 is slid by sliding the connecting portion 131c. The sliding member 131 is formed in a rectangle and is shorter in length in the direction of the line X as compared with that of the groove 132b. The sliding member 131 is formed with a large opening 131a located near the connecting portion 131c. A side defining the opening 131a, which is located opposite to a side of the connecting portion 131c, is formed with a projecting portion 131b which pushes the end portions 30c of the spring 30. With this arrangement, the sliding member 131 is slid so as to enlarge the lock spring 30 in diameter by means where the connecting portion 131c is pushed by the control lever 33.

In this second embodiment, when the partition plate is detached, a detaching operation is carried out as follows: First, the control lever 33 positioned at the upper side is pushed to be lifted at its first end 33a as indicated by an arrow D in FIG. 12. Then, the control lever 33 is turned anticlockwise as shown in FIG. 13. When the control lever 33 is turned anticlockwise as shown in FIG. 13, the connecting portion 131c is pushed by the first end 33a so as to move along the line X. Simultaneously, the projecting portion 131b moves along the groove 131b through the connecting portion 131c in accordance with the movement of the sliding member 131. As a result, the nipping portion 30b is deformed to be enlarged at its inner diameter, thereby releasing the connecting pin 28. With this operation, the connecting pin 28 becomes free from the lock spring 30. Next, the partition plate 20 is lifted so that a clearance is formed between the partition plate 20 and the step section 26a. The partition plate 20 is detached by being pulled out. The control lever 33 receives a biasing force of the spring 35 so as to be returned into a flat state relative to the board 21.

While only two embodiments have been shown and described, it will be understood that the present invention is not limited to these embodiments and that various modifications and improvements can be applied to this invention. It will be appreciated that thus arranged partition plate may be used as a tonneau board with which a passenger room and a luggage compartment are divided, and as a cover board closing an opening of a member defining an engine compartment.

What is claimed is:

1. A partition plate in use for a vehicle, said partition plate being detachable from a member defining a compartment which member is provided with a projecting pin, said partition plate comprising:
   a board section; and
   a locking device installed to said board section, said locking device including:
   a housing member having a through-hole through which the projecting pin passes from one surface to the other surface of said housing member when the partition plate is secured to the compartment defining member;
   a lock spring of a generally C-shape, having a middle portion and a pair of opposite end portions, said lock spring lockably engageable with the projecting pin, said middle portion being fixed to said housing member, said opposite end portions defining a clearance therebetween;
   a sliding member having a generally wedge shaped portion, said wedge shaped portion being disposed in said lock spring clearance and contactable with the lock spring end portions that said lock spring is deformable upon movement of said sliding member; and
   a pair of control levers connected to said sliding member to move said sliding member against a bias of said lock spring, said pair of control levers being located opposite to each other with respect to a center plane of said board section.

2. A partition plate as claimed in claim 1, further comprising a supporting plate which is disposed in said housing member and in which said lock spring and said sliding member are disposed.

3. A partition plate as claimed in claim 1, wherein said sliding member is connected to said control lever through a connecting shaft and a connecting member which are secured to said sliding member.

4. A partition plate as claimed in claim 1, wherein said control lever is secured to said housing member with a shaft.

5. A partition plate as claimed in claim 2, wherein said lock spring is formed of a spring wire and includes a pair of nipping portions, each of the nipping portions springingly engageable with the projecting pin and integral with the middle portion and the end portion.

6. A partition plate in use for a vehicle, said partition plate being detachable from a member defining a compartment which member is provided with a projecting pin, said partition plate comprising:
   a board section; and
   a locking device installed to said board section, said locking device including:
   a housing member having a through-hole through which the projecting pin passes from one surface to the other surface of said housing member when the partition plate is secured to the compartment defining member;

a lock spring secured to said housing and lockably engageable with the projecting pin, said lock spring taking one of a first state in which said lock spring lockably engages with the projecting pin and a second state in which a lockable engagement of said lock spring and the projecting pin is released;

a sliding member contacted with said lock spring so that said lock spring is deformable to take one of said first and second states upon movement of said sliding member; and a pair of control levers connected to said sliding member to move said sliding member against a bias of said lock spring, said pair of control levers being located opposite to each other with respect to the center plane of said board section.

7. A combination in use for a vehicle comprising:

a projecting pin fixed to a member defining a compartment of the vehicle, said projecting pin having a slender portion which is slender as compared with a tip end portion thereof; and a partition plate detachable from the compartment defining member, said partition plate including:

a board section having first and second surfaces which are opposite to each other with respect to a center plane;

means for allowing either one of the first and second surfaces of said board section to contact with the compartment defining member;

a locking device installed to said board section and having first and second surfaces which are generally flush with the first and second surfaces of said board section, said locking device including; a housing member having a through-hole through which said projecting pin passes through from one surface to the other surface of said housing member when the partition plate is secured to the compartment defining member, a lock spring secured to said supporting plate and lockably engageable with the slender portion of said projecting pin, said lock spring taking one of a first state in which said lock spring lockably engages with said projecting pin and a second state in which a lockable engagement of said lock spring and said projecting pin is released, a sliding member connected to said lock spring in a manner that said lock spring is deformable to take one of said first and second states upon movement of said sliding member and a pair of control levers connected to said sliding member to move said sliding member against a bias of said lock spring, said pair of control lever being located opposite to each other with respect to the center plane of said board section.

* * * * *